(12) United States Patent
Okada et al.

(10) Patent No.: US 8,925,416 B2
(45) Date of Patent: Jan. 6, 2015

(54) STEERING LOCK DEVICE

(75) Inventors: Takahiro Okada, Yokohama (JP); Kenjirou Hayashi, Atsugi (JP)

(73) Assignees: Alpha Corporation, Yokohama-Shi, Kanagawa (JP); Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/009,624

(22) PCT Filed: Mar. 23, 2012

(86) PCT No.: PCT/JP2012/002029
§ 371 (c)(1),
(2), (4) Date: Oct. 3, 2013

(87) PCT Pub. No.: WO2012/137436
PCT Pub. Date: Oct. 11, 2012

(65) Prior Publication Data
US 2014/0026708 A1    Jan. 30, 2014

(30) Foreign Application Priority Data
Apr. 4, 2011 (JP) ................................ 2011-082645

(51) Int. Cl.
*B60R 25/02* (2013.01)
*B62D 1/16* (2006.01)
*B60R 25/021* (2013.01)

(52) U.S. Cl.
CPC ............... *B62D 1/16* (2013.01); *B60R 25/0211* (2013.01)
USPC .............................................. 74/495; 70/252

(58) Field of Classification Search
CPC .................... B60R 25/02153; B60R 25/0215; B60R 25/021; B60R 25/02; B62D 1/16
USPC ........................................ 74/495; 70/252, 237
See application file for complete search history.

(56) References Cited

U.S. PATENT DOCUMENTS

| 8,205,517 B2 * | 6/2012 | Fukushima et al. ............ 74/409 |
| 2009/0064739 A1 | 3/2009 | Trischberger et al. |

FOREIGN PATENT DOCUMENTS

| EP | 1 167 135 A1 | 1/2002 | |
| EP | 2 025 567 A2 | 2/2009 | |
| EP | 2 130 726 A1 | 12/2009 | |
| JP | 2009-248843 A | 10/2009 | |
| WO | WO 2010016458 A1 * | 2/2010 | |
| WO | WO 2010024386 A1 * | 3/2010 | .............. B60R 25/02 |

* cited by examiner

*Primary Examiner* — Keith Frisby
(74) *Attorney, Agent, or Firm* — Nath, Goldberg & Meyer; Jerald L. Meyer; Stanley N. Protigal (57) ABSTRACT

An auxiliary lock mechanism that locks a lock member (6) at a steering lock position is provided. In the auxiliary lock member, a slide plate (91) thereof engages with an auxiliary engagement portion (95) of the lock member (6) located at the steering lock position in such a manner that engagement between a holding member (21) and a holding/receiving portion (93) thereof is disengaged. On a more rear end side of the lock member (6) than the auxiliary engagement portion (95), a fragile portion (74) is provided, in which a load is set smaller than a load tolerable by the slide plate (91). In a case where a load of a set value or more is applied to the lock member (6), the lock member (6) is torn at the fragile portion (74).

12 Claims, 10 Drawing Sheets

Fig. 1

PRIOR ART

STEERING LOCK DEVICE

This is a National Phase Application filed under 35 U.S.C. 371 as a national stage of PCT/JP2012/002029, filed Mar. 23, 2012, claiming the benefit from Japanese Application No. 2011-082645, filed Apr. 4, 2011, the content of each of which is hereby incorporated by reference in its entirety.

TECHNICAL FIELD

The present invention relates to a steering lock device that locks rotation of a steering shaft of an automobile.

BACKGROUND ART

Figure 1:
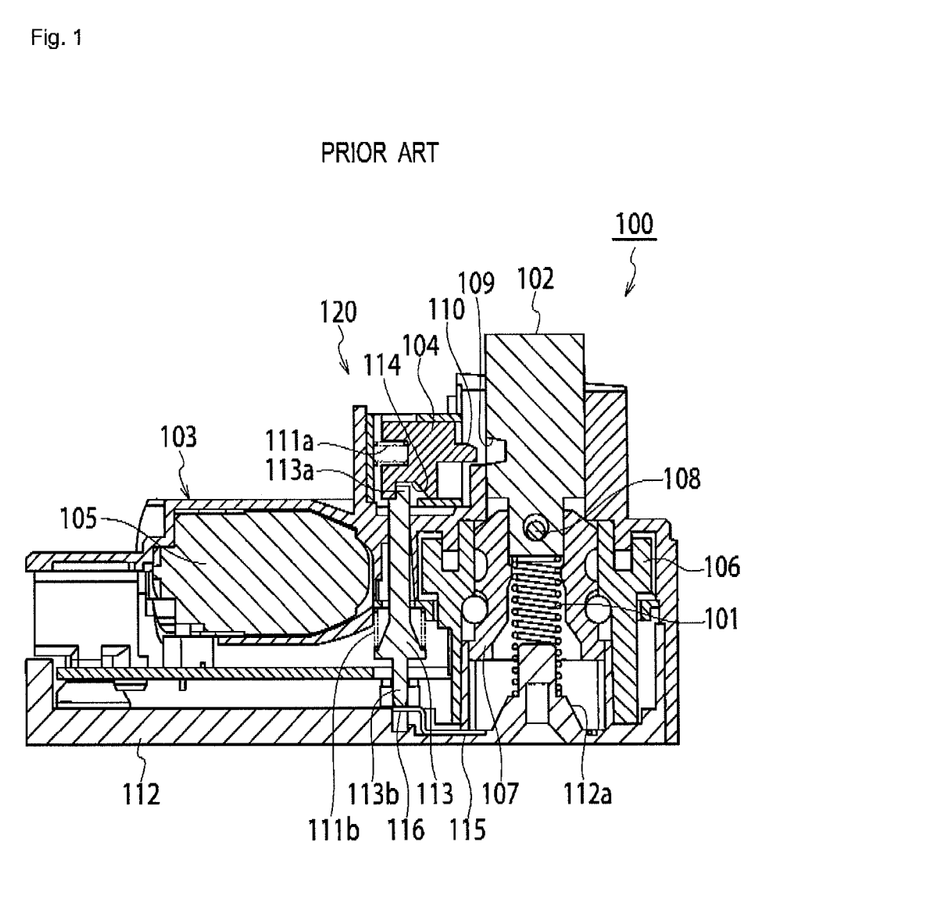
FIG. 1 is a cross-sectional view showing a steering lock state of a steering lock device of a conventional technology.
Figure 2:
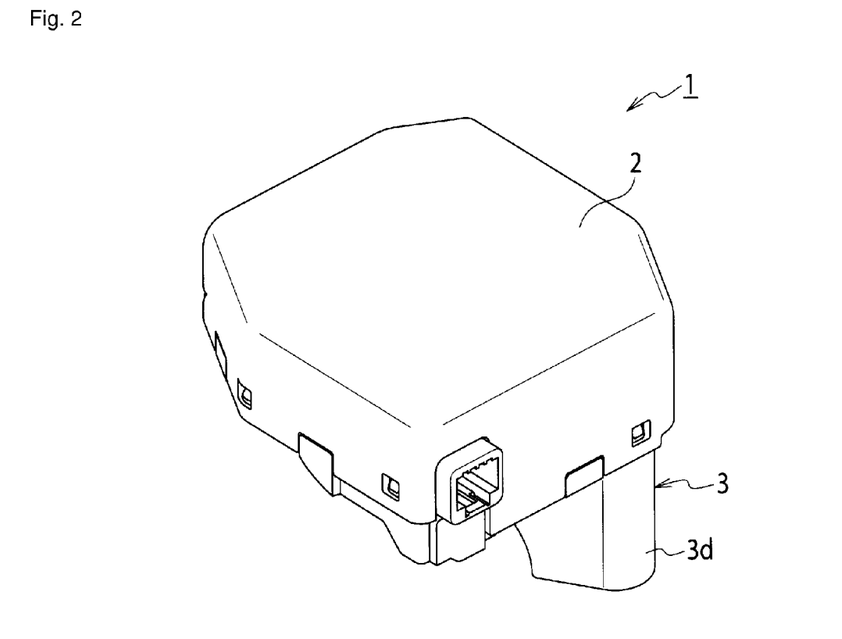
FIG. 2 shows an embodiment of the present invention, and is an overall perspective view of a steering lock device.
Figure 3:
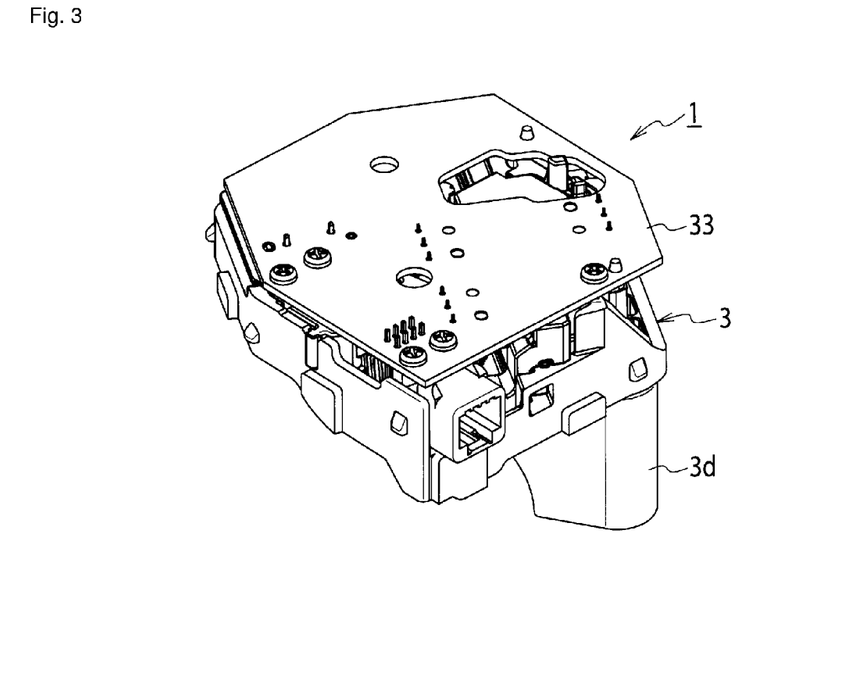
FIG. 3 shows the embodiment of the present invention, and is a perspective view showing a state where a cover is detached from FIG. 2.
Figure 4:
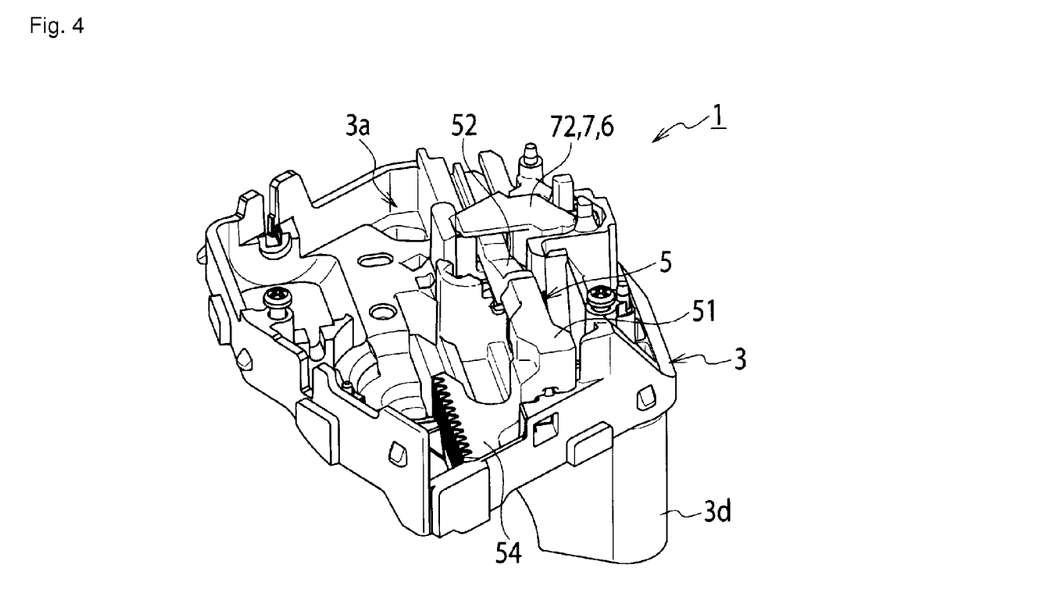
FIG. 4 shows the embodiment of the present invention, and is a perspective view showing a state where a circuit board and the like are detached from FIG. 3.

As this type of conventional steering lock device, there is one disclosed in Japanese Patent Laid-Open Publication No. 2009-248843 (Patent Literature 1). As shown in FIG. 1, this steering lock device 100 includes: a lock member 102 that is urged in a direction (upward direction of FIG. 1) of a steering shaft (not shown) of an automobile by a coiled spring 101, and is fittable to the steering shaft; a drive body 103 that drives this lock member 102; and an auxiliary lock mechanism 120 that is arranged in the vicinity of the lock member 102, and is capable of locking the lock member 102 at a steering lock position. Moreover, the drive body 103 includes: a rotation member 106 to be driven by a motor 105 through a worm (not shown); and a cam member 107 that moves reciprocally in a moving direction of the lock member 102 by rotation of this rotation member 106, and this cam member 107 is coupled to the lock member 102 through a coupling pin 108. The auxiliary lock mechanism 120 is composed of a slide plate 104, a holding shaft 113, spring members 111a and 111b, and a holding member 115.

The slide plate 104 includes an engagement projection 110 capable of engaging with an engagement groove 109 of a side portion of the lock member 102, and is urged in a direction of the lock member 102 by the spring member 111a. Moreover, the holding shaft 113 is extended from a back surface of a frame cover 112 along the moving direction of the lock member 102 toward the slide plate 104. A tip end portion 113a of this holding shaft 113 engages with an engagement groove portion 114 of the slide plate 104, whereby the slide plate 104 is kept in a state of being spaced apart from the lock member 102.

By the spring member 111a, the holding shaft 113 is urged in a direction of being spaced apart from the slide plate 104. Moreover, an engagement pin 116 is extended from the holding member 115 detachably fitted into the back surface of the frame cover 112. A tip end of this engagement pin 116 engages with a rear end portion 113b of the holding shaft 113, whereby a state where the holding shaft 113 engages with the slide plate 104 is kept.

In the above-described configuration, when the motor 105 is rotated in a lock direction at the time of parking, the rotation member 106 rotates by drive force of the motor 105, and the cam member 107 moves in the lock direction (upward direction of FIG. 1) of the lock member 102. Therefore, the lock member 102 positionally shifts to the steering lock position by urging force of the coiled spring 101. As a result, a tip end of the lock member 102 fits to the steering shaft, and rotation of the steering shaft is inhibited, and accordingly, the automobile turns to an unsteerable state.

Thereafter, when the motor 105 is rotated in a lock release direction, the rotation member 106 rotates in a reverse direction, and the lock member 102 positionally shifts to a lock release position together with the cam member 107. As a result, the fitting of the lock member 102 to the steering shaft is released, accordingly, the rotation of the steering shaft becomes free, and the automobile turns to a steerable state.

Moreover, in such a lock state shown in FIG. 1, the holding shaft 113 protrudes from the back surface of the frame cover 112 toward the slide plate 104, and a tip end thereof engages with the engagement groove portion 114 of the slide plate 104. In such a way, the slide plate 104 is kept in a state of being spaced apart from the lock member 102.

Subsequently, in the case where external force is applied to the steering lock device 100 from the frame cover 112 side at the time of parking such a vehicle by an illegal unlocking action, the holding member 115 falls off from the back surface of the frame cover 112, and moves a tapered portion 112a. In such a way, the engagement between the engagement pin 116 and the holding shaft 113 is disengaged, the holding shaft 113 moves to the frame cover 12 side, and the holding shaft 113 separates from the engagement groove portion 114 of the slide plate 104. Therefore, the slide plate 104 is urged in the direction of the lock member 102 by the spring member 111a, and the engagement projection 110 engages with the engagement groove 109 of the side portion of the lock member 102. In such a way, the lock member 102 is stopped at the steering lock position, accordingly, the rotation of the steering shaft is inhibited, a malfunction that the vehicle becomes steerable by an illegal lock release operation can be prevented, and stealing-proof of the vehicle at the time of parking the vehicle can be enhanced.

CITATION LIST

Patent Literature

PTL 1: Japanese Patent Laid-Open Publication No. 2009-248843

SUMMARY OF INVENTION

Technical Problem

As described above, in the conventional steering lock device 100, when the frame cover 112 is detached to expose an inside thereof by the illegal unlocking action, then the motor 105, the rotation member 106 and the like are detached, and it is made possible to touch the cam member 107. Therefore, though the lock member 102 is held at the steering lock position by the slide plate 104, there has been an apprehension that, in the case where the cam member 107 is attempted to be pulled out with strong force, the steering lock may be released as a result that the slide plate 104 is broken to thereby release such an auxiliary lock.

In this connection, it is an object of the present invention to provide a steering lock device that does not enable the lock member to be pulled out even if the lock member is attempted to be forcibly pulled out with strong force after the cover is detached.

Solution to Problem

In order to achieve the foregoing object, a first aspect of the present invention provide a steering lock device comprising: a lock member arranged freely movably between a steering lock position and a steering lock release position; an auxiliary lock mechanism that holds the lock member at the steering lock position at an illegal unlocking; and a fragile portion disposed between the lock member and the auxiliary lock mechanism, being torn due to a load applied to the lock member to hold the lock member at the steering lock position at an illegal unlocking.

A second aspect of the present invention provides a steering lock device including: a lock member arranged freely slidably between a steering lock position and a steeling lock release position, the lock member having a tip end engage with a steering shaft at the steering lock position; an auxiliary engagement portion provided on the lock member; and an auxiliary lock member that is arranged freely slidably between an auxiliary lock position and an auxiliary lock release position, and in state of being located at the auxiliary lock position, engages with the auxiliary engagement portion of the lock member located at the steering lock position, and locks the lock member at the steering lock position, wherein the steering lock device is provided with: a fragile portion provided in a region of the lock member on a more rear end side than the auxiliary engagement portion, the fragile portion having a withstand load set smaller than a load tolerable by the auxiliary lock member, and being torn when a load of a set value or more is applied to the lock member in a state where the auxiliary lock member and the auxiliary engagement portion engage with each other.

Moreover, a third aspect of the present invention provides a steering lock device including: a cover; a frame covered with the cover; a lock member that is provided in a lock guide hole provided in the frame, is arranged freely slidably between a steering lock position and a steering lock release position, and has a tip end engage with a steering shaft at the steering lock position; and an auxiliary lock mechanism having an auxiliary engagement portion provided on the lock member, an auxiliary lock member that is arranged in the frame freely slidably between an auxiliary lock position and an auxiliary lock release position, and is urged by urging means to a steering lock position side of engaging with the auxiliary engagement portion, and a holding member having one end fixed to the cover, in which, in a state where the cover is assembled to the frame, a tip end of the holding member makes engagement with a holding/receiving portion of the auxiliary lock member located at the auxiliary lock release position, and holds the auxiliary lock member at the auxiliary lock release position, in which, in an event where the cover relatively moves from the frame, the engagement between the holding member and the holding/receiving portion is disengaged, the auxiliary lock member moves from the auxiliary lock release position to the auxiliary lock position by urging force of the urging means, and the auxiliary lock member engages with the auxiliary engagement portion of the lock member located at the steering lock position, and locks the lock member at the steering lock position, wherein the steering lock device is provided with: a fragile portion provided in a region of the lock member on a more rear end side than the auxiliary engagement portion, the fragile portion having a withstand load set smaller than a load tolerable by the auxiliary lock member, and being torn when a load of a set value or more is applied to the lock member in a state where the auxiliary lock member and the auxiliary engagement portion engage with each other.

The auxiliary lock member may be made of a plate-like slide plate, and the auxiliary engagement portion may be made of a coupling pin protruded on the lock member.

The fragile portion may be provided in a region located in the lock guide hole of the lock member located at the steering lock position.

The load tolerable by the fragile portion may be set larger than a load applied to the lock member in an event where the lock member slides between the steering lock position and the steering lock release position.

The load tolerable by the fragile portion may be set smaller than the load tolerable by each of the auxiliary lock member and the auxiliary engagement portion.

Advantageous Effects of Invention

In accordance with the above-described configuration, in the case where the load of the set value or more is applied to the fragile portion as a result that the lock member is attempted to be forcibly pulled out with strong force, the fragile portion is torn, and accordingly, it becomes impossible to pull out the lock member. With such a configuration, the stealing-proof can be further enhanced.

In the case where the plate-like member is slid and allowed to engage with the protruded pin, then a relatively simple configuration is formed, and accordingly, accurate operations can be performed. With such a configuration, the stealing-proof can be further enhanced.

In the case where the load of the set value or more is applied to the fragile portion, and the fragile portion is torn, then the lock member remains in the lock guide hole, the remaining lock member cannot be touched, and it becomes impossible to pull out the lock member. With such a configuration, the stealing-proof can be further enhanced.

In the case where the load applied to the fragile portion is set larger than the load applied to the lock member in the event where the lock member slides between the steering lock position and the steering lock release position, the fragile portion comes not be torn by usual operations. With such a configuration, activation reliability of the whole of the device can be enhanced.

In the case where the load tolerable by the fragile portion is set smaller than the load tolerable by each of the auxiliary lock member and the auxiliary engagement portion, then in the event where the steering lock device is subjected to a trial of the illegal unlocking, the fragile portion is torn before the lock member is pulled out. With such a configuration, the stealing-proof can be further enhanced.

DESCRIPTION OF EMBODIMENTS

A description is made below of an embodiment of the present invention based on the drawings. As shown in FIG. 2 to FIG. 14, a steering lock device 1 of this embodiment includes a cover 2 and a frame 3, which are assembled to each other, and is attached to a steering column device (not shown) that houses a steering shaft (not shown) of an automobile.

In an inside of the frame 3, there are formed: a component housing chamber 3a open toward one side (upper side of FIG. 4, FIG. 5 and the like); a lock guide hole 3b that penetrates the frame 3 from a bottom portion of the component housing chamber 3a to a steering column device side, and is extended in a direction perpendicular to an axial direction of the steering shaft; and an auxiliary lock housing hole 3c extended in a direction orthogonal to this lock guide hole 3b. Moreover, the frame 3 includes a pair of leg portions 3d and 3d arranged so as to straddle the steering column device.

In the component housing chamber 3a, there are housed: a motor 31 as a drive source; a worm wheel (not shown) that rotates in an unlocking direction and a locking direction by drive of a worm gear 32 of a rotation shaft of this motor; and a slide member 5 that is driven through the worm wheel, and slides in a direction perpendicular to a lock member 6 to be described later.

In the lock guide hole 3b, a lock member 6 that holds a lock state of the steering shaft is housed. Moreover, in the auxiliary lock housing hole 3c, an auxiliary lock mechanism 9 is housed, which holds the lock member 6 at a locking position in the case where the cover 2 is detached from the frame 3.

Figure 5:
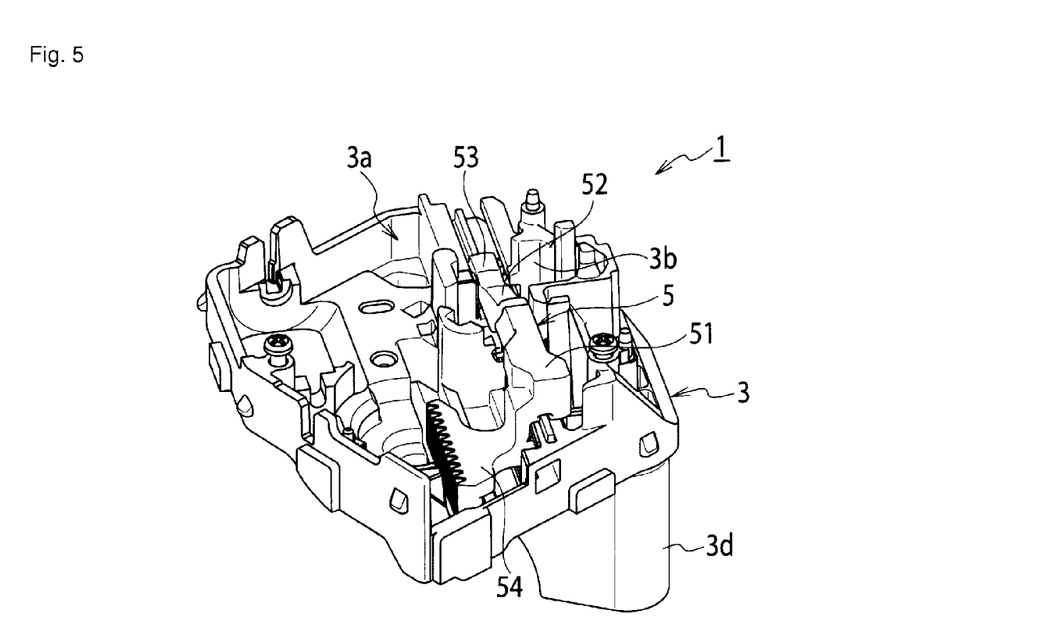
FIG. 5 shows the embodiment of the present invention, and is a perspective view showing a state where a rear end side of a hanger is removed from FIG. 4 after being torn at a fragile portion.
Figure 6:
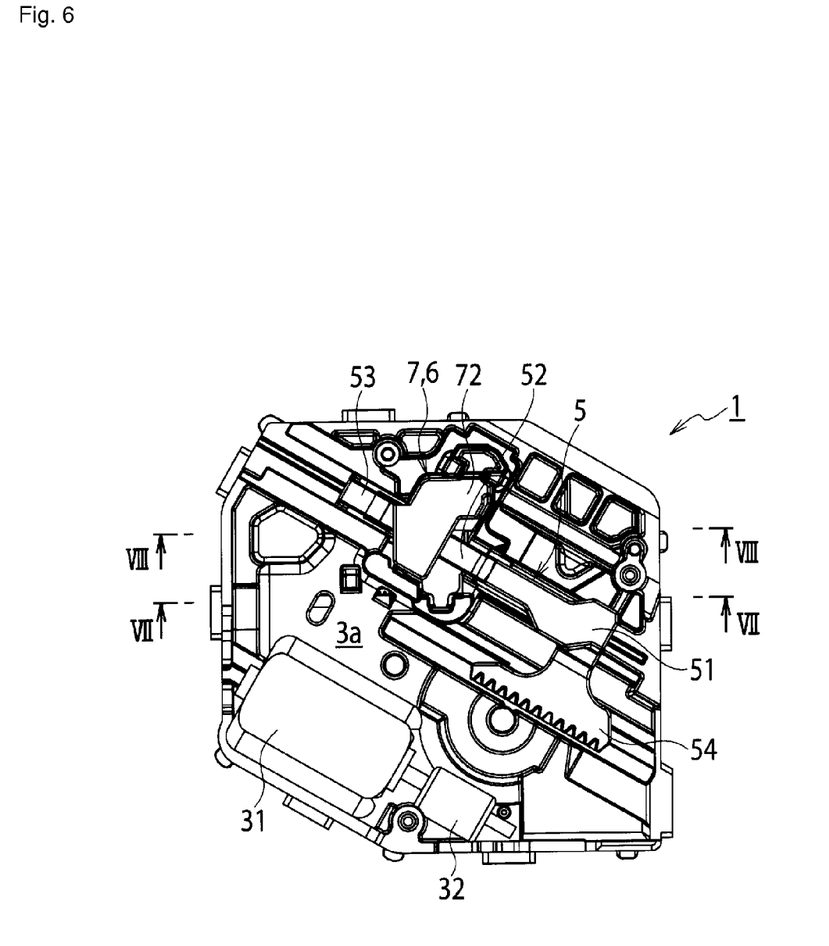
FIG. 6 shows the embodiment of the present invention, and is a plan view showing a steering lock state in FIG. 5.
Figure 7:
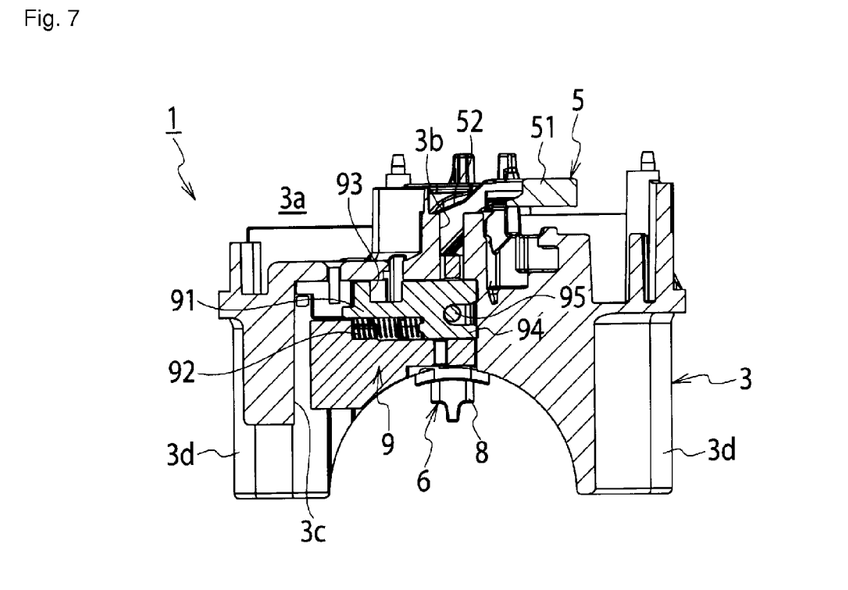
FIG. 7 shows the embodiment of the present invention, and is a cross-sectional view taken along a line VII-VII of FIG. 6.
Figure 8:
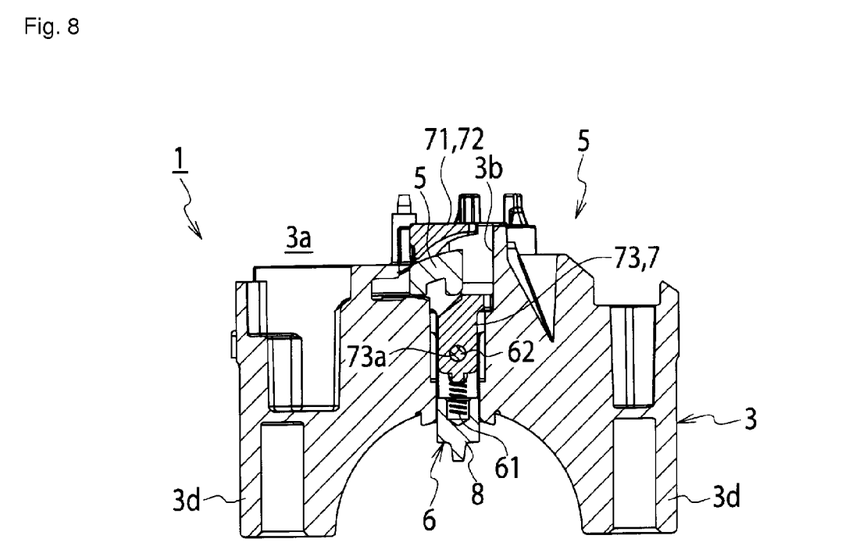
FIG. 8 shows the embodiment of the present invention, and is a cross-sectional view taken along a line VIII-VII of FIG. 6.
Figure 9:
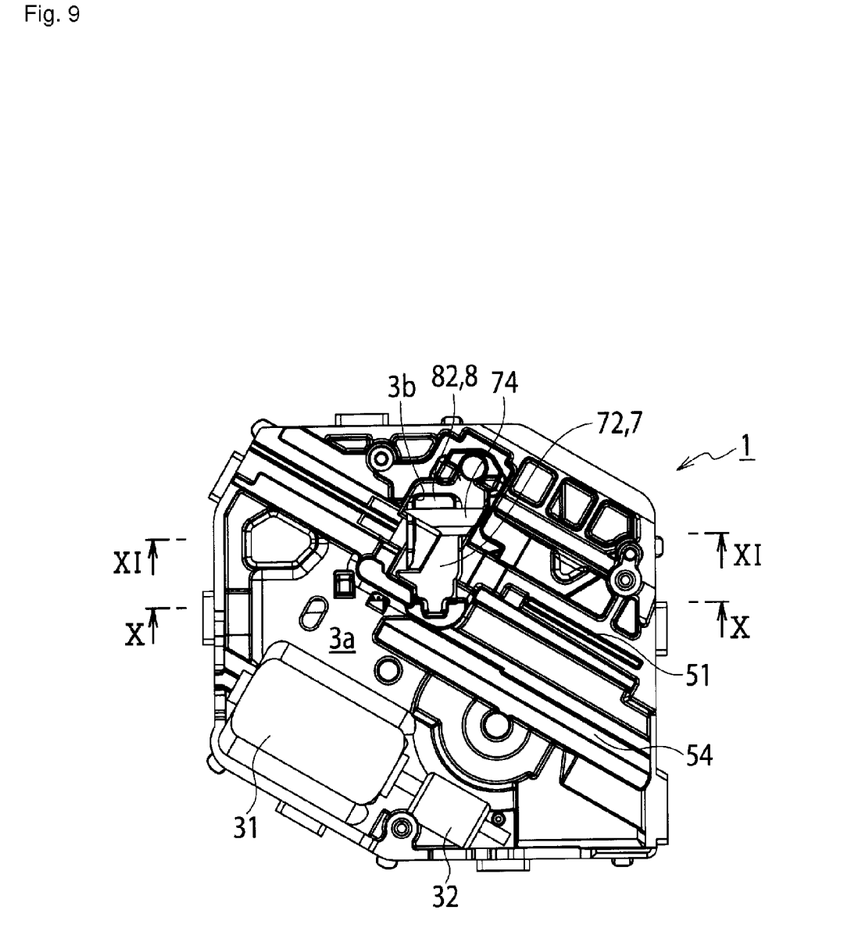
FIG. 9 shows the embodiment of the present invention, and is a plan view showing the steering lock state in FIG. 5.
Figure 10:
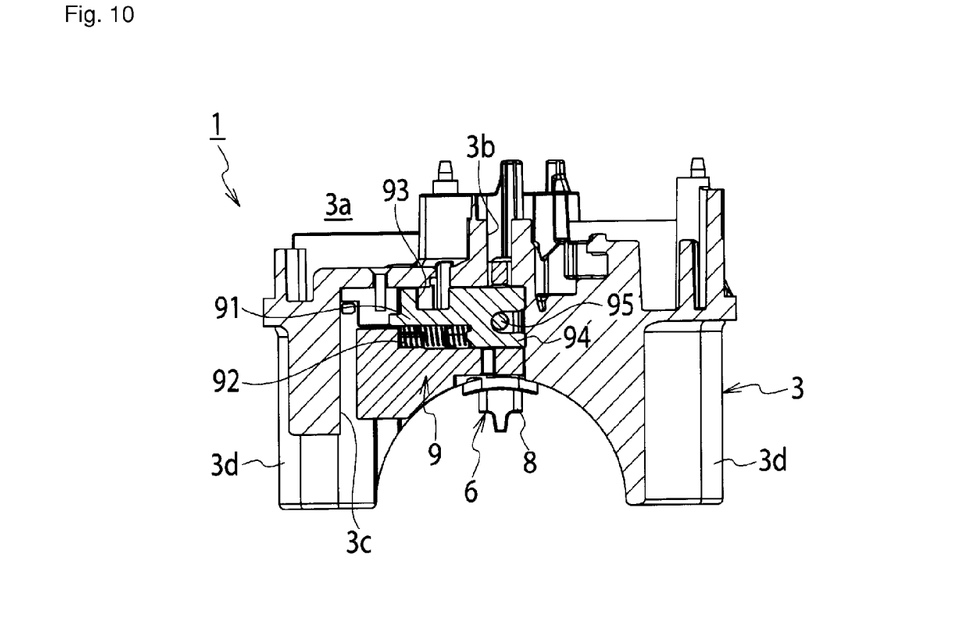
FIG. 10 shows the embodiment of the present invention, and is a cross-sectional view taken along a line X-X of FIG. 9.
Figure 11:
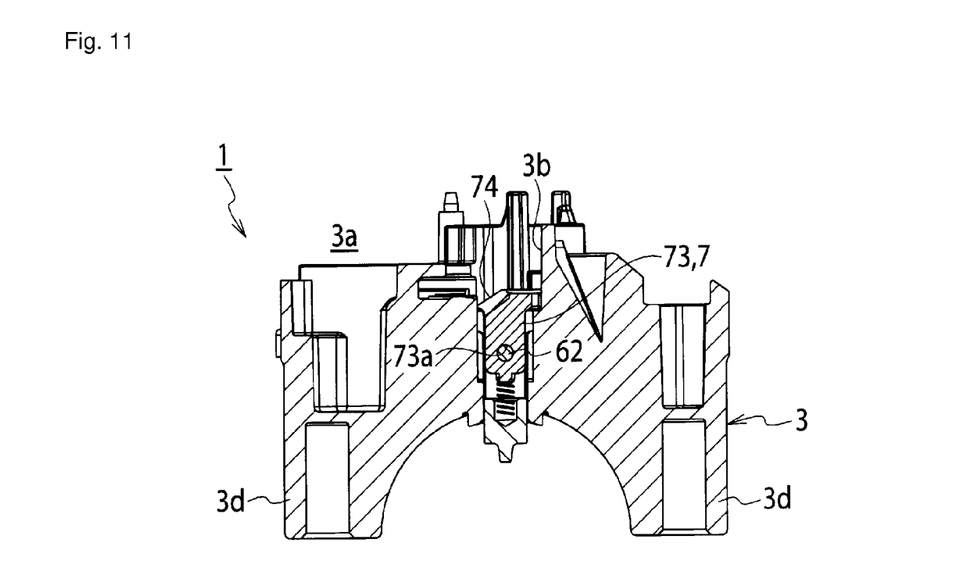
FIG. 11 shows the embodiment of the present invention, and is a cross-sectional view taken along a line XI-XI of FIG. 9.

As shown in FIG. 5, the slide member 5 is composed of: a base portion 51 extended in a slide direction; an inclined portion 52 that protrudes from one end of the base portion 51, and is gradually inclined in a direction of the steering shaft toward a tip end side; and a tip end portion 53 that protrudes from the inclined portion 52 in the sliding direction. Moreover, on the base portion 51, a rack portion 54 that meshes with the worm wheel is provided. Furthermore, the slide member 5 is arranged so as to be slidable between a lock end and a lock release end, which are set in the component housing chamber 3a.

The lock member 6 is mainly composed of a hanger 7 and a lock body 8. The hanger 7 composes a rear end side of the lock member 6, and links with the slide member 5. The lock body 8 composes a tip end side of the lock member 6, and is coupled to the hanger 7 by a coupling pin 62. The lock body 8 is arranged so that a tip end thereof can go in and out of a bottom surface of the frame 3, is fitted to the steering shaft in a state of protruding from the bottom surface of the frame 3, and then locks the steering shaft (steering lock state). Then, between the hanger 7 and the lock body 8, a coiled spring 61 as urging means is interposed. By compression reaction force of the coiled spring 61, the lock body 8 is urged from a steering lock release position side toward a steering lock position side. Moreover, one end of the coupling pin 62 protrudes from the lock member 6, and composes an auxiliary engagement portion 95 that composes the auxiliary lock mechanism 9 to be described later.

Figure 12:
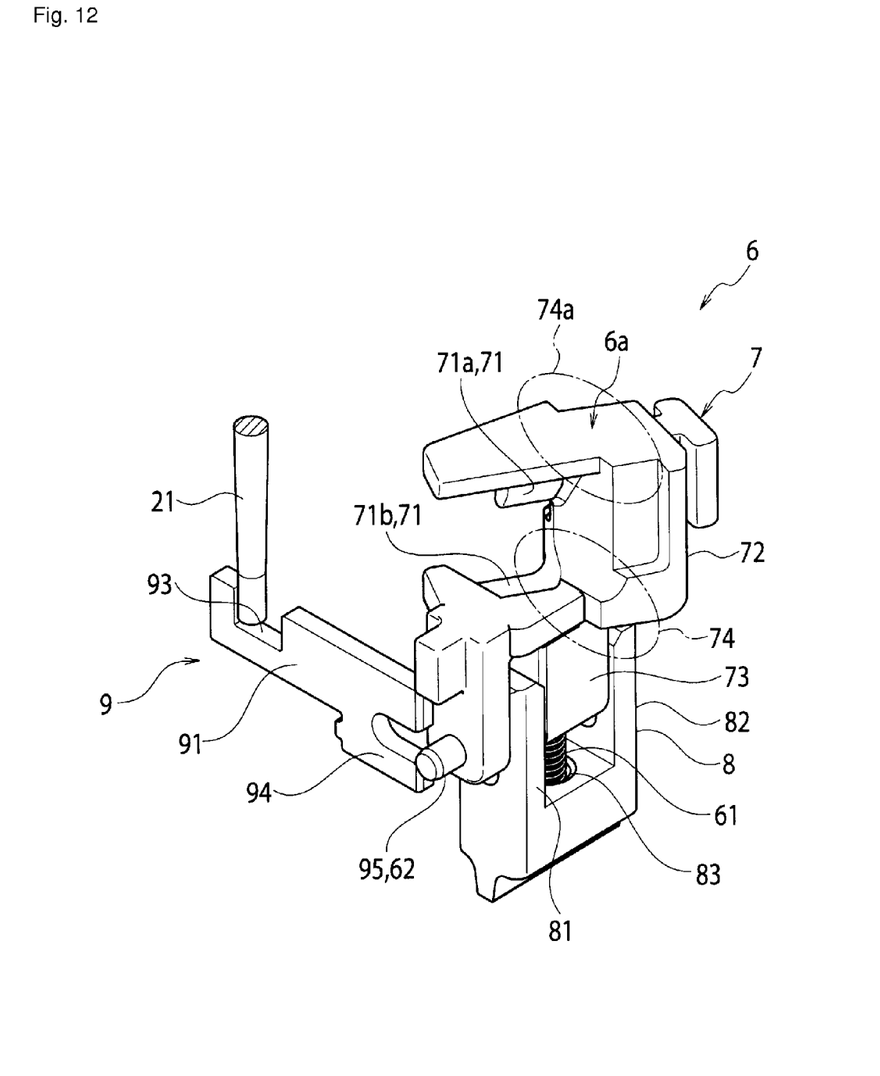
FIG. 12 shows the embodiment of the present invention, and is a main portion perspective view showing a state where a holding shaft engages with a slide plate at a steering lock time.
Figure 13:
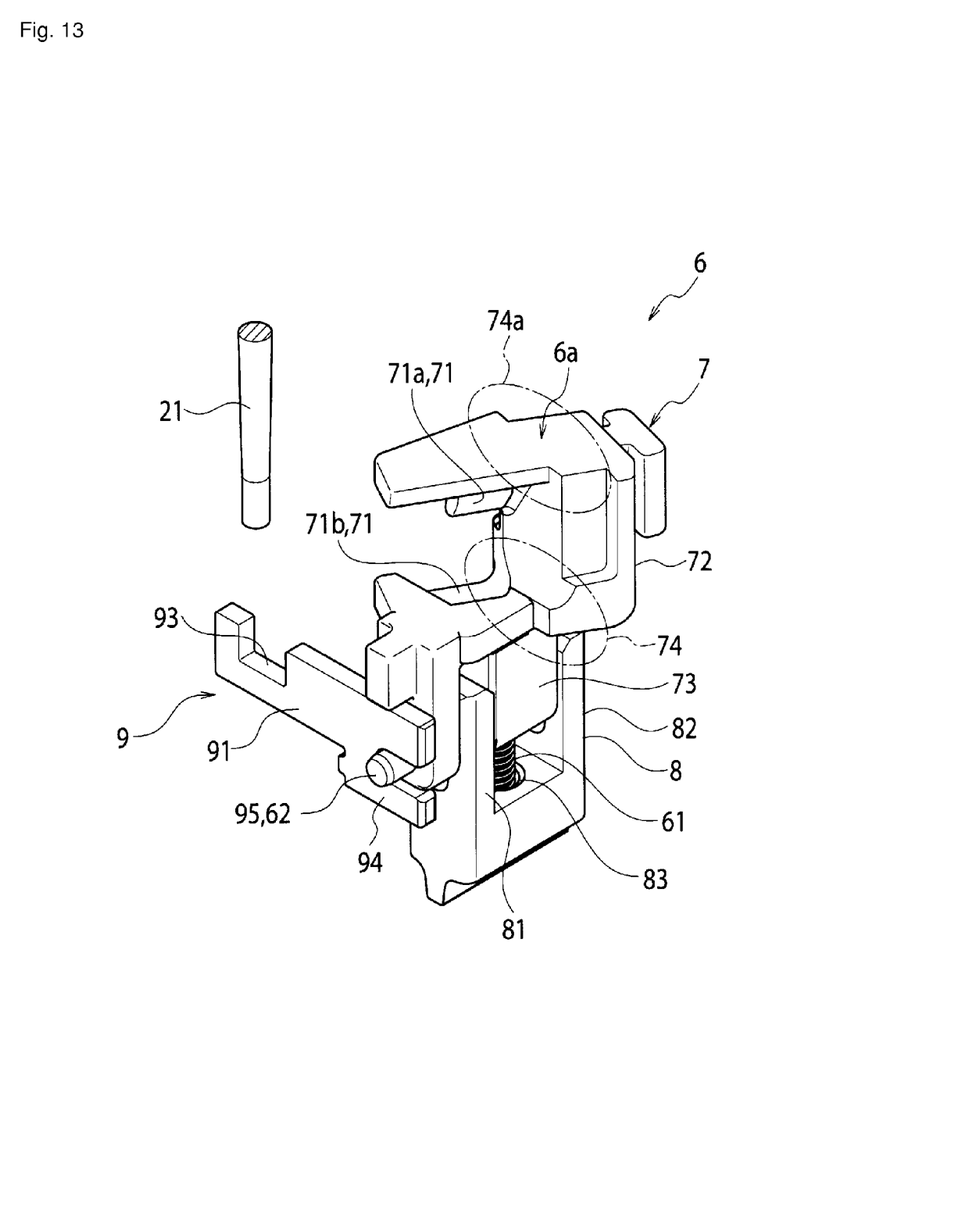
FIG. 13 shows the embodiment of the present invention, and is a main portion perspective view showing a state where the holding shaft separates from the slide plate at the steering lock time.
Figure 14:
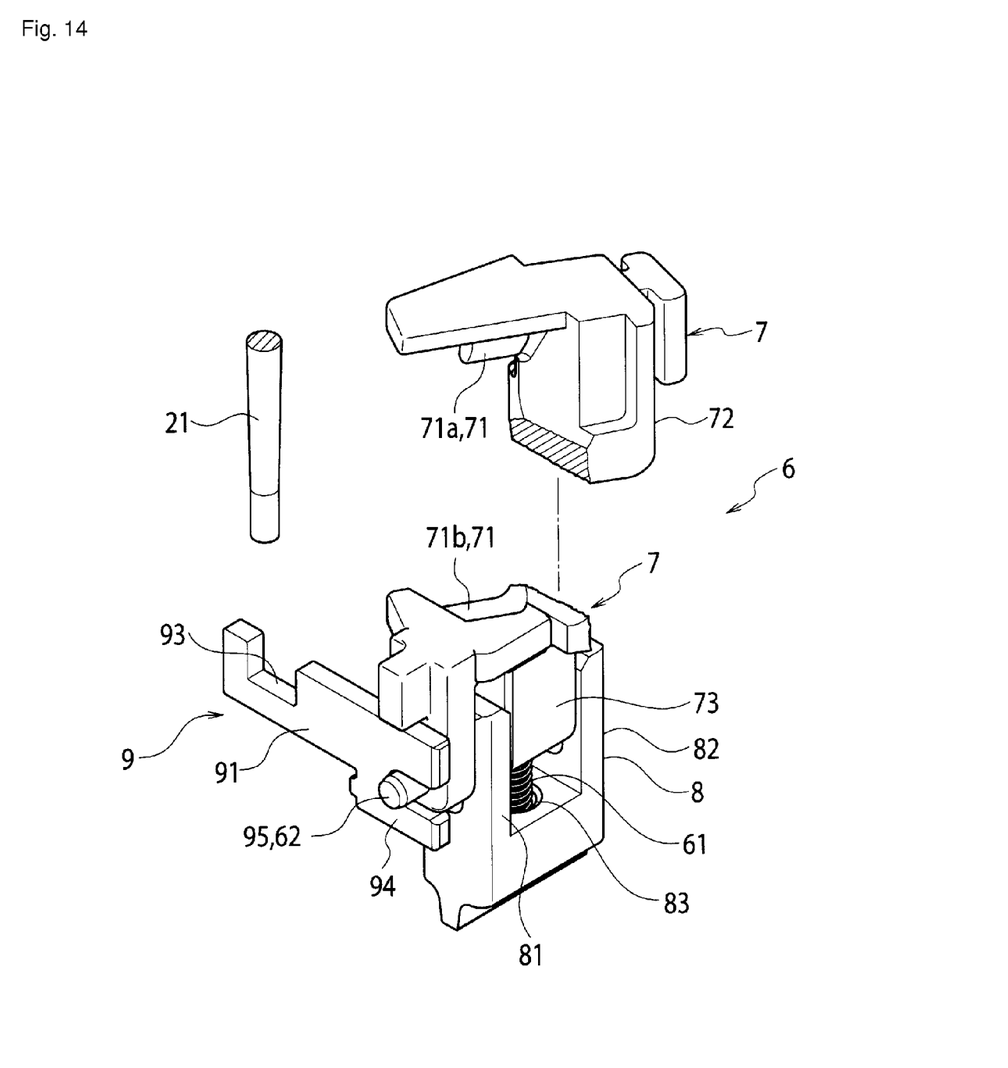
FIG. 14 shows the embodiment of the present invention, and is a main portion perspective view showing a state where the hanger is torn at the fragile portion at the steering lock time.

As shown in FIG. 12 to FIG. 14, the hanger 7 is mainly composed of a base portion 72 and a coupling portion 73. The base portion 72 includes an inclination receiving portion 71, which is located at a rearmost end portion of the lock member 6, has a substantially U shape in cross section, the shape being open along the bottom portion of the component housing chamber 3a, and has an inclination receiving portion 71 inserted through an inside thereof. Then, on an edge portion of a rear end side of the inclination receiving portion 71, a lock release inclined portion 71a is set, and on an edge portion of a tip end side of the inclination receiving portion 71, a lock inclined portion 71b is set.

Moreover, a fragile portion 74 is set on a root portion of the lock inclined portion 71b. The fragile portion 74 is located more on a rear end side 6a of the lock member 6 than the auxiliary engagement portion 95, and is set so that mechanical strength thereof can be weaker in comparison with other regions of the hanger 7. That is to say, in the event where the hanger 7 moves on the inclined portion 52 of the slide member 5, and the lock member 6 is moved between the steering lock position and the steering lock release position, in the case where the tip end of the lock member 6 meshes with the steering shaft, then a tensile load is applied to the hanger 7 at the time of pulling out the lock member 6. A withstand load of the fragile portion 74 against such a load is set a predetermine value that the fragile portion 74 can be provided with sufficient strength without being deformed or torn. Moreover, in the event where a load is applied to the lock member 6 in a direction of pulling the same from the steering lock position to the steering lock release position in a state where a slide plate 91 to be described later and the auxiliary engagement portion 95 engage with each other, the withstand load of the fragile portion 74 is set so that the fragile portion 74 can be torn before the slide plate 91 and the auxiliary engagement portion 95 are deformed or town. Note that the withstand voltage is set by contrivances to thin a dimension of the fragile portion 74 than those of other regions, to drill the fragile portion 74, and so on.

The coupling portion 73 protrudes from the base portion 72 in the direction of the steering shaft (that is, to the tip end side of the lock member 6), and is coupled to the lock body 8 through the coupling pin 62. A surface (wide surface) of the coupling portion 73 in a width direction is arranged in parallel to the axial direction of the steering shaft, and a round hole 73a to which the coupling pin 62 is to be fitted is extended in the width direction.

As shown in FIG. 12 to FIG. 14, on a rear end-side end portion of the lock body 8, a pair of arm portions 81 and 82 which protrude in a direction of the hanger 7 (that is, upward in FIG. 12 to FIG. 14) are provided, and in the respective arm portions 81 and 82, long holes (not shown) long in a moving direction of the hanger 7 are provided, and the coupling pin 62 is movably inserted into the long holes. In a cover 2-side end portion of the lock body 8, which is located between the arm portions 81 and 82 thereof, a spring seat-ready hole 83 that receives other end of the coiled spring 61 is formed.

The auxiliary lock mechanism 9 is composed of: the slide plate (auxiliary lock member) 91 extended from a wide surface of the lock member 6 in a plate thickness direction of the lock member 6; a coiled spring (urging means) 92 that urges the slide plate 91 in a direction of the coupling pin 62 of the lock member 6; a holding shaft (holding member) 21 protruded on an inner surface of the cover 2; and one end (auxiliary engagement portion 95) of the above-described coupling pin 62.

The slide plate 91 and the coiled spring 92 are arranged more on the outside than the wide surface of the lock member 6 so as to be slidable between an auxiliary lock position where the slide plate 91 engages with a projection of the lock member located at the steering lock position and an auxiliary lock release position where the slide plate 91 allows the slide of the lock member. Moreover, as shown in FIG. 12, on one end side of the slide plate 91, an engagement recessed portion (holding/receiving portion) 93 is formed, with which a tip end of the holding shaft 21 protruding to the inside from the back surface of the cover 2 engages. On other end of the slide plate 91, a bifurcated engagement end portion 94 is formed, which receives the coupling pin 62 in a manner of sandwiching the same from upper and lower sides.

The holding shaft 21 is formed into a shaft shape, and is formed integrally with the cover 2 on the inner surface of the cover 2 provided with a box shape in which one surface is open. Then, with regard to the holding shaft 21, in a state where the cover 2 is assembled to the frame 3, the tip end of the holding shaft 21 concerned engages with the engagement recessed portion 93 of the slide plate 91 located at the auxiliary lock release position, and the slide plate 91 is held at the auxiliary lock release position. Moreover, when the cover 2 falls off from the frame 3, the engagement between the holding shaft 21 and the engagement recessed portion 93 is disengaged, and the slide plate 91 moves to the auxiliary lock position by urging force of the coiled spring 92.

Next, a description is made of operations of the above-described steering lock device 1. When the motor 31 is activated, drive force of the motor 31 transmits to the slide member 5 through the rack portion 54, and the slide member 5 slides. Then, in the event where the slide member 5 slides to a lock end side, the lock inclined portion 71*b* of the hanger 7 moves on the inclined portion 52, whereby the lock member 6 moves to the steering lock position of inhibiting the rotation of the steering shaft, and the lock body 8 protrudes from the bottom surface of the frame 3, and is fitted to the steering shaft. As a result, the rotation of the steering shaft is inhibited, and accordingly, the automobile is kept in an unsteerable state (steering lock state). Moreover, in the event where the slide member 5 slides to a lock release end side, the lock release inclined portion 71*a* moves on the inclined portion 52, whereby the lock member 6 moves to the steering lock release position of allowing the rotation of the steering shaft, the lock body 8 is retreated into the frame 3, and the rotation of the steering shaft is allowed. Accordingly, the automobile turns to a steerable state (steering lock release state).

Moreover, in the above-described steering lock state, as shown in FIG. 12, the slide plate 91 is urged to and held on an auxiliary lock position side by the urging force of the coiled spring 92. In the case where the cover 2 is detached from the frame 3 by an illegal action, as shown in FIG. 13, the holding shaft 21 of the cover 2 separates from the engagement recessed portion 93 of the slide plate 91. As a result, the slide plate 91 moves from the auxiliary lock release position to the auxiliary lock position, and the engagement end portion 94 of the slide plate 91 engages with the coupling pin 62 of the lock body 8 in the manner of sandwiching the same from the upper and lower sides. In such a way, movement of the lock member 6 (hanger 7 and lock body 8) is inhibited, and the steering lock state by the lock body 8 is held.

Then, when the circuit board 33, the motor 31, the worm wheel and the like are detached by a further illegal unlocking action, the hanger 7 is exposed. When a load of a set value or more is applied to the hanger 7 from such a state as a result that the hanger 7 is attempted to be forcibly pulled out with strong force, then as shown in FIG. 14, the hanger 7 is torn at the fragile portion 74. In such a way, the remaining hanger 7 cannot be pulled out. Moreover, the remaining hanger 7 is located at a deep spot of the lock guide hole 3*b*, and accordingly, the remaining hanger 7 and lock body 8 cannot be touched, it becomes impossible to pull out the lock member 6, and the steering lock state is held.

From the above, stealing-proof of the steering lock device can be enhanced without complicating the configuration thereof.

Note that, in this embodiment, the fragile portion 74 is set on the root portion (U-shaped tip end-side corner portion) of the lock inclined portion 71*b*. However, without being limited to this, it is also possible to set a fragile portion 74*a* (refer to FIG. 12) in a region of the hanger 7, which is located more on the rear end side 6*a*, as in a root portion (U-shaped rear end-side corner portion) of the lock release inclined portion 71*a*.

Moreover, in this embodiment, one fragile portion is set in the hanger 7; however, two or more fragile portions may be set, and the withstand load of the fragile portion 74 on the tip end side of the lock member 6 may be set so as to be larger than a withstand load of the fragile portion 74*a* on the rear end side thereof. With such a configuration, in the case where the lock member 6 is attempted to be forcibly pulled out with strong force, first, the fragile portion 74*a* on the rearmost end is torn. Then, even if the lock member 6 is further attempted to be pulled out, next, the fragile portion 75 as another in such a pair is torn, and it becomes impossible to pull out the lock member 6. In such a way, it takes long to perform the illegal unlocking, and in addition, the unlocking cannot be performed after all. Accordingly, the stealing-proof can be further enhanced.

Moreover, in this embodiment, a configuration is adopted so that, by the matter that the cover 2 is detached from the frame 3, the engagement between the holding shaft 21 and the engagement recessed portion 93 can be released, and the slide plate 91 can be allowed to move from the auxiliary lock release position to the auxiliary lock position. However, without being limited to this, such a configuration may be adopted, in which, by the matter that the cover 2 rotates on the frame 3, and so on, the holding shaft 21 relatively moves on the frame 3, the engagement between the holding shaft 21 and the engagement recessed portion 93 is released, and the slide plate is allowed to move from the auxiliary lock release position and the auxiliary lock position.

The invention claimed is:

1. A steering lock device comprising:
    a lock member arranged freely movably between a steering lock position and a steering lock release position;
    an auxiliary lock mechanism that holds the lock member at the steering lock position at an illegal unlocking; and
    a fragile portion disposed between the lock member and the auxiliary lock mechanism, being torn due to a load applied to the lock member to hold the lock member at the steering lock position at an illegal unlocking,
    wherein the fragile portion has a withstand load set smaller than a load tolerable by the auxiliary lock member,
    wherein the withstand load of the fragile portion is set larger than a load tolerable by the lock member in an event where the lock member slides between the steering lock position and the steering lock release position.

2. A steering lock device comprising:

a lock member arranged freely slidably between a steering lock position and a steering lock release position, the lock member having a tip end engage with a steering shaft at the steering lock position;

an auxiliary engagement portion provided on the lock member; and an auxiliary lock member that is arranged freely slidably between an auxiliary lock position and an auxiliary lock release position, and in state of being located at the auxiliary lock position, engages with the auxiliary engagement portion of the lock member located at the steering lock position, and locks the lock member at the steering lock position, wherein the lock member comprises a fragile portion at a region on a more rear end side than the auxiliary engagement portion, the fragile portion having a withstand load set smaller than a load tolerable by the auxiliary lock member, and being torn when a load of a set value or more is applied to the lock member in a state where the auxiliary lock member and the auxiliary engagement portion engage with each other, wherein the load tolerable by the fragile portion is set larger than a load tolerable by the lock member in an event where the lock member slides between the steering lock position and the steering lock release position.

3. The steering lock device according to claim 2, wherein the auxiliary lock member is made of a plate-like slide plate, and the auxiliary engagement portion is made of a coupling pin protruded on the lock member.

4. The steering lock device according to claim 3, wherein the fragile portion is provided in a region located in the lock guide hole of the lock member located at the steering lock position.

5. The steering lock device according to claim 3, wherein the load tolerable by the fragile portion is set smaller than the load tolerable by each of the auxiliary lock member and the auxiliary engagement portion.

6. The steering lock device according to claim 2, wherein the fragile portion is provided in a region located in the lock guide hole of the lock member located at the steering lock position.

7. The steering lock device according to claim 6, wherein the load tolerable by the fragile portion is set smaller than the load tolerable by each of the auxiliary lock member and the auxiliary engagement portion.

8. The steering lock device according to claim 2, wherein the load tolerable by the fragile portion is set smaller than the load tolerable by each of the auxiliary lock member and the auxiliary engagement portion.

9. A steering lock device comprising:

a cover;

a frame covered with the cover;

a lock member that is provided in a lock guide hole provided in the frame, is arranged freely slidably between a steering lock position and a steering lock release position, and has a tip end engage with a steering shaft at the steering lock position; and an auxiliary lock mechanism including an auxiliary engagement portion provided on the lock member, an auxiliary lock member that is arranged in the frame freely slidably between an auxiliary lock position and an auxiliary lock release position, and is urged by urging means to a steering lock position side of engaging with the auxiliary engagement portion, and a holding member having one end fixed to the cover, in which, in a state where the cover is assembled to the frame, a tip end of the holding member makes engagement with a holding/receiving portion of the auxiliary lock member located at the auxiliary lock release position, and holds the auxiliary lock member at the auxiliary lock release position, in which, the tip end of the holding member engages with the holding/receiving portion of the auxiliary lock member so that in an event where the cover relatively moves from the frame, the engagement between the holding member and the holding/receiving portion is disengaged, the auxiliary lock member moves from the auxiliary lock release position to the auxiliary lock position by urging force of the urging means, and the auxiliary lock member engages with the auxiliary engagement portion of the lock member located at the steering lock position, and locks the lock member at the steering lock position, wherein the lock member comprises a fragile portion at a region on a more rear end side than the auxiliary engagement portion, the fragile portion having a withstand load set smaller than a load tolerable by the auxiliary lock member, and being torn when a load of a set value or more is applied to the lock member in a state where the auxiliary lock member and the auxiliary engagement portion engage with each other, wherein the load tolerable by the fragile portion is set larger than a load tolerable by the lock member in an event where the lock member slides between the steering lock position and the steering lock release position.

10. The steering lock device according to claim 9, wherein the auxiliary lock member is made of a plate-like slide plate, and the auxiliary engagement portion is made of a coupling pin protruded on the lock member.

11. The steering lock device according to claim 9, wherein the fragile portion is provided in a region located in the lock guide hole of the lock member located at the steering lock position.

12. The steering lock device according to claim 9, wherein the load tolerable by the fragile portion is set smaller than the load tolerable by each of the auxiliary lock member and the auxiliary engagement portion.

* * * * *